(12) United States Patent
Zenner et al.

(10) Patent No.: US 10,894,486 B2
(45) Date of Patent: Jan. 19, 2021

(54) ASSEMBLY AND METHOD FOR COOLING A TRACTION BATTERY OF A VEHICLE USING FUEL

(71) Applicant: Ford Global Technologies, LLC, Dearborn, MI (US)

(72) Inventors: Thomas Zenner, Dueren (DE); Caroline Born, Cologne (DE); Daniel Kok, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 16/254,731

(22) Filed: Jan. 23, 2019

(65) Prior Publication Data
US 2019/0225110 A1 Jul. 25, 2019

(30) Foreign Application Priority Data

Jan. 24, 2018 (DE) .......................... 10 2018 201 112

(51) Int. Cl.
*B60L 58/26* (2019.01)
*B60K 6/28* (2007.10)
(Continued)

(52) U.S. Cl.
CPC ............... *B60L 58/26* (2019.02); *B60K 1/04* (2013.01); *B60K 6/28* (2013.01); *B60K 15/01* (2013.01); *B60K 15/03* (2013.01); *F02M 37/0023* (2013.01); *F02M 37/0076* (2013.01); *H01M 2/1072* (2013.01); *H01M 2/1083* (2013.01); *H01M 10/613* (2015.04); *H01M 10/625* (2015.04); *H01M 10/66* (2015.04); *B60K 2001/0438* (2013.01); *B60K 2015/03243* (2013.01); *B60K 2015/03256* (2013.01); *B60K 2015/0631* (2013.01); *B60Y 2200/92* (2013.01);
(Continued)

(58) Field of Classification Search
CPC combination set(s) only.
See application file for complete search history.

(56) References Cited

U.S. PATENT DOCUMENTS 4,013,300 A * 3/1977 Berger .................. B60K 15/00
280/834
4,703,771 A * 11/1987 Mimura ............... B60K 15/077
137/142
(Continued)

FOREIGN PATENT DOCUMENTS

JP 2007302123 11/2007
JP 2007320331 12/2007

*Primary Examiner* — Joseph J Dallo
*Assistant Examiner* — Kurt Philip Liethen
(74) *Attorney, Agent, or Firm* — David Kelley, Esq.; Carlson, Gakey & Olds, P.C.

(57) ABSTRACT

This disclosure relates to an assembly that cools a traction battery of a vehicle, in particular a hybrid electric vehicle. The assembly can include at least one fuel tank, and at least one traction battery that is arranged outside the fuel tank and is thermally connected to the fuel tank. The assembly can further include at least one fuel pump that is arranged in the fuel tank and at least one fuel line that is connected and/or can be connected to a pressure side of the fuel pump. A connection portion of the fuel tank is thermally connected to the traction battery. Fuel can be used to cool the connection portion, which cools the traction battery.

18 Claims, 10 Drawing Sheets

(51) Int. Cl.
*H01M 10/625* (2014.01)
*B60K 15/01* (2006.01)
*B60K 1/04* (2019.01)
*H01M 2/10* (2006.01)
*B60K 6/22* (2007.10)
*H01M 10/66* (2014.01)
*H01M 10/613* (2014.01)
*B60K 15/03* (2006.01)
*F02M 37/00* (2006.01)
*B60K 15/063* (2006.01)

(52) U.S. Cl.
CPC ...... *B60Y 2306/05* (2013.01); *H01M 2220/20* (2013.01)

(56) References Cited

U.S. PATENT DOCUMENTS

| | | | | |
|---|---|---|---|---|
| 7,051,716 | B2* | 5/2006 | Maasz | B60K 15/077 123/509 |
| 8,393,426 | B2* | 3/2013 | Takahashi | B60K 15/063 180/68.5 |
| 9,321,347 | B2* | 4/2016 | Cragel | B60K 15/03 |
| 2003/0178007 | A1* | 9/2003 | McCarville | F02M 31/20 123/541 |
| 2004/0140009 | A1* | 7/2004 | Yu | F02M 37/0058 137/565.22 |
| 2005/0274361 | A1* | 12/2005 | Ikeya | F02M 69/54 123/457 |
| 2012/0248252 | A1 | 10/2012 | Al-Ali et al. | |

\* cited by examiner

ASSEMBLY AND METHOD FOR COOLING A TRACTION BATTERY OF A VEHICLE USING FUEL

CROSS-REFERENCE TO RELATED APPLICATIONS

This application claims priority to German Patent Application No. 102018201112.5, which was filed on 24 Jan. 2018 and is incorporated herein by reference in its entirety.

TECHNICAL FIELD

This disclosure relates generally to cooling of a traction battery and, more particularly, to cooling using fuel.

BACKGROUND

Hybrid electric vehicles have at least one traction battery, by means of which, during electric drive mode of the hybrid electric vehicle, electrical drive devices of the hybrid electric vehicle can be supplied with electrical energy. The traction battery can be arranged in the hybrid electric vehicle in such a manner that the passenger compartment and the storage space of the hybrid electric vehicle are limited to the smallest possible extent or not at all. To this end, the traction battery is, for example, constructed as an underfloor unit, in particular below the rear bench type seat and at the front side with respect to the rear axle of the hybrid electric vehicle. In this instance, the traction battery shares a structural space with the fuel tank of the hybrid electric vehicle, which leads to a reduced tank volume.

An arrangement of the traction battery close to other components of the hybrid electric vehicle may make the required cooling of the traction battery more difficult, for example, when surfaces of the traction battery cannot be subjected to a cooling air flow. This leads to poor heat discharge from the traction battery and consequently to higher operating temperatures of the traction battery and the battery cells thereof, which can lead to a reduction of the battery power and/or the battery service-life.

JP 2007 302 123 A discloses a motor vehicle having a battery which is arranged adjacent to a fuel tank so that, in order to cool the battery, heat of the battery can be transferred to fuel in the fuel tank. An electronic control system decides on the basis of the temperature of the battery whether it is necessary to cool the battery or not. If it is necessary to cool the battery, the electronic control system controls an electromagnetic valve so that at least a portion of the fuel discharged from the fuel tank can be returned to the fuel tank through a return line. If the fuel circulates over this path, the fuel loses heat, whereby a heat exchange between the battery and the fuel is brought about.

JP 2007 320 331 A discloses a hybrid electric vehicle having a battery which is immersed in a liquid fuel inside a fuel tank. The battery can be cooled by a coldness of the fuel. When the hybrid electric vehicle travels, the fuel moves inside the fuel tank as a result of a speed change or the hybrid electric vehicle travelling around a bend, whereby the inner side of the battery is cooled.

US 2012 248 252 A1 discloses a cooling system for cooling a fuel cell system in a vehicle using a fuel in a fuel tank as a heat sink.

SUMMARY

An exemplary aspect of the present disclosure is to provide a cooling system that can be implemented in a cost-effective manner for a traction battery of a vehicle, in particular a hybrid electric vehicle.

In an exemplary embodiment, at least one line portion of a fuel line, which is present inside a fuel tank, is thermally connected to a connection portion of the fuel tank. The connection portion is thermally connected to the traction battery. The line portion could be partially formed by the connection portion. The fuel line could instead have at least one fuel outlet opening which is arranged in the fuel tank and which is arranged in such a manner relative to the connection portion of the fuel tank such that a fuel discharged from the fuel outlet opening flows over at least a portion of the connection portion.

It should be noted that the features and measures set out individually in the following summary can be combined with each other in any technically advantageous manner to provide other embodiments.

In an exemplary embodiment, the traction battery is cooled by means of the fuel tank or the fuel located therein. The fuel tank and the fuel form a heat sink. The traction battery can be thermally connected to the fuel tank in such a manner that a transfer of heat from the battery cells of the traction battery to the fuel tank is possible with little, and in some example, the least possible thermal resistance. The surface of the fuel tank can be used to increase the heat discharge surface which is available. No additional air or liquid cooling is required so that the cooling of the traction battery can be carried out in a cost-effective manner.

If the fuel is pumped through the fuel line, the fuel is guided through the line portion of the fuel line which is provided inside the fuel tank and consequently directly along the connection portion of the fuel tank which is thermally connected to the traction battery. It is thereby possible for the fuel flowing past the connection portion to absorb heat which has been transmitted from the traction battery to the connection portion. The fuel thus transports the heat away from the connection portion and can supply the heat to a heat sink which may be present. The line portion of the fuel line may either be connected to the connection portion of the fuel tank, for example, in a materially integral manner, or partially formed by the connection portion. The latter means that a portion of the wall of the line portion may be formed by the connection portion.

Alternatively or additionally, the fuel line may have at least one fuel outlet opening which is arranged in the fuel tank and which is arranged relative to the connection portion of the fuel tank in such a manner that the fuel discharged from the fuel tank outlet flows over at least a portion of the connection portion. It is thereby possible for the fuel flowing past the connection portion to absorb heat which has been transferred from the traction battery to the connection portion. The fuel thus transports the heat away from the connection portion and acts at the same time as a heat sink.

The fuel tank may be partially or completely formed from a metal sheet in order to enable good heat transfer between the traction battery and the fuel. Alternatively, the fuel tank may be partially or completely formed from a plastics material or a composite material.

The fuel pump which is arranged in the fuel tank can, during purely electrical travel mode, be at least temporarily switched on in order to cool the traction battery as required. The fuel line which is connected and/or can be connected to the pressure side of the fuel pump may be a fuel line for supplying an internal combustion engine of the hybrid electric vehicle with the fuel. Alternatively, the fuel line may be provided in addition to a corresponding fuel supply line. Alternatively, the fuel line may be formed by means of a portion of a fuel supply line which is connected to the fuel pump and a return line which branches off from the fuel supply line. The return line may be connected to the fuel supply line by means of an electrically controllable valve.

The traction battery which is arranged outside the fuel tank and which is thermally connected to the fuel tank has a plurality of battery cells, for example, lithium ion battery cells which can be combined to form individual battery cell modules. The battery cells may be installed inside a battery housing of the traction battery in such a manner that heat from the battery cells is transmitted directly to the battery housing. To this end, the battery cells can be directly connected to the portion of the battery housing which is connected to the connection portion of the fuel tank.

The traction battery can be connected to the fuel tank in such a manner that a clamping force between the traction battery and the fuel tank is produced in order to ensure a maximum surface contact between the traction battery and the fuel tank to facilitate an optimum heat transfer from the traction battery to the fuel tank.

In an exemplary embodiment, the line portion of the fuel line has at least one expanded flow chamber which is thermally connected to the connection portion of the fuel tank or which is partially formed by the connection portion and whose height provided with respect to a connection region between the fuel tank and the traction battery is many times smaller than a width and a length of the flow chamber. The flow chamber consequently has two large main sides, which are arranged parallel with each other, wherein one of the main sides is connected to the connection portion. The contact face between the line portion and the connection portion of the fuel tank can thereby be increased which enables a transmission of heat to the fuel flowing through the line portion over a larger surface-area, whereby the cooling of the traction battery is further improved.

Another embodiment makes provision for the traction battery to be at least partially thermally connected to the fuel tank via a heat-conducting paste or at least one heat distribution plate. The heat-conducting paste, can facilitate heat transfer between the traction battery and the fuel tank. To this end, the heat-conducting paste is applied previously, for example, in a planar manner, to the traction battery and/or the connection portion of the fuel tank. By means of the heat distribution plate, the heat produced in the battery cells of the traction battery can be better distributed over the entire contact face between the traction battery and the connection portion of the fuel tank, which makes the cooling of the traction battery more uniform and consequently more effective.

In another exemplary embodiment, the fuel outlet opening is arranged in such a manner relative to the connection portion that the fuel discharged from the fuel outlet opening first comes into contact with a vertically higher region of the connection portion. Afterwards, the fuel is directed directly to the connection portion, first to the vertically higher region of the connection portion. From this region of the connection portion, the fuel can then flow under the action of gravitational force along the connection portion in order to act with the fuel on the connection portion to the fullest possible extent in order to cool the traction battery. The fuel flowing away from the connection portion can flow into a region of the fuel tank which is arranged vertically lower, where the heat is distributed over the remaining fuel and is discharged over the wall of the fuel tank which is in contact with the fuel. The outlet opening may, for example, be constructed in a slot-like manner. The connection portion of the fuel tank may, when the assembly is arranged correctly on the hybrid electric vehicle, extend in an inclined or vertical manner. In this instance, the traction battery may at least be arranged for the most part laterally beside the fuel tank.

In another exemplary embodiment, the fuel line is arranged exclusively inside the fuel tank. At least one electrically controllable valve is arranged on the fuel line and the assembly has at least one electronic control system, which is electrically connected to the valve and which is configured to control the valve in accordance with a current temperature of the traction battery. Accordingly, the fuel line is thus not used to supply an internal combustion engine of the hybrid electric vehicle with fuel. A fuel supply line is additionally provided and connected to the pressure side of the fuel pump. The assembly may have at least one temperature sensor which is electrically connected to the electronic control system and by means of which the current temperature of the traction battery or of at least one battery cell of the traction battery can be detected. The valve may be closed, open or partially opened and retained temporarily in accordance with the cooling requirement established by the electronic control system. At a temperature of the traction battery below a lower limit value, the valve can be closed by means of the electronic control system. At a temperature of the traction battery above an upper limit value, the valve can be opened by means of the electronic control system. In a temperature range between the lower limit value and the upper limit value, the valve can be partially opened by means of the electronic control system. In addition, the valve can be closed by means of the electronic control system when a travel speed in a purely electric travel mode of the hybrid electric vehicle is lower than a specific speed limit value, for example, 30 km/h, since then only relatively little heat is produced in the traction battery.

Another exemplary embodiment makes provision for the fuel line to be formed by means of a portion of a fuel supply line which is connected to the pressure side of the fuel pump and which connects the fuel tank to an internal combustion engine and a fuel return line which is connected thereto and which is guided into the fuel tank. The fuel return line may be connected by means of an electrically controllable valve or without such a valve so as to communicate with the fuel supply line.

The assembly can have at least one cooler which is arranged outside the fuel tank and which is thermally connected to the fuel line. The fuel which is supplied to the fuel tank via the fuel return line can thereby be cooled beforehand in order to be able to absorb more heat inside the fuel tank, which can further improve the cooling of the traction battery.

In other example embodiments, the assembly can have at least one electronic control system which is electrically connected to the fuel pump and which is configured to at least temporarily control the fuel pump in such a manner that a pump power of the fuel pump is higher than required for current operation of the internal combustion engine. The electronic control system may be the above-mentioned electronic control system or a separate electronic control system. The fuel return line is in this embodiment connected without a valve so as to communicate with the fuel supply line. Since the internal combustion engine does not require the quantity of fuel supplied from the fuel pump, the excess portion of fuel is necessarily pumped through the fuel return line and supplied to the fuel tank in order to cool the traction battery. If no cooling of the traction battery is required, which the electronic control system can establish on the basis of a detected current temperature of the traction battery, the pump power can be reduced in order to exclusively produce the pump power which is required for the current operation of the internal combustion engine. The pump power can be varied individually, in particular continuously, by means of the electronic control system depending on the respective current temperature of the traction battery.

The above object can be further achieved by a vehicle, in particular a hybrid electric vehicle which has at least one assembly according to any one of the above-mentioned embodiments or any combination of at least two of these embodiments with each other.

The advantages mentioned above with regard to the assembly are accordingly connected with the vehicle, in particular the hybrid electric vehicle. The vehicle, in particular the hybrid electric vehicle, may be, for example, a plug-in hybrid electric vehicle. The vehicle, in particular the hybrid electric vehicle, can have at least one internal combustion engine which can be supplied with fuel from the fuel tank by means of the fuel pump.

Although the exemplary embodiments are described in connection with hybrid vehicles, purely electric vehicles are also included within the scope of this disclosure. Although electric vehicles have no internal combustion engine for driving the vehicle, they may have fuel-operated units, such as, for example, fuel-operated auxiliary heating systems. These electric vehicles naturally have in this regard a fuel tank which stores the fuel for the fuel-operated units. This fuel tank of the purely electric vehicle or the fuel stored in the fuel tank may as described above be used for cooling the battery as necessary.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

The disclosure relates to an assembly for a vehicle, in particular for a hybrid electric vehicle, having at least one fuel tank, at least one traction battery which is arranged outside the fuel tank and which is thermally connected to the fuel tank, at least one fuel pump which is arranged in the fuel tank and at least one fuel line which is connected and/or can be connected to a pressure side of the fuel pump. Furthermore, the disclosure relates to a vehicle, in particular a hybrid electric vehicle.

Figure 1:
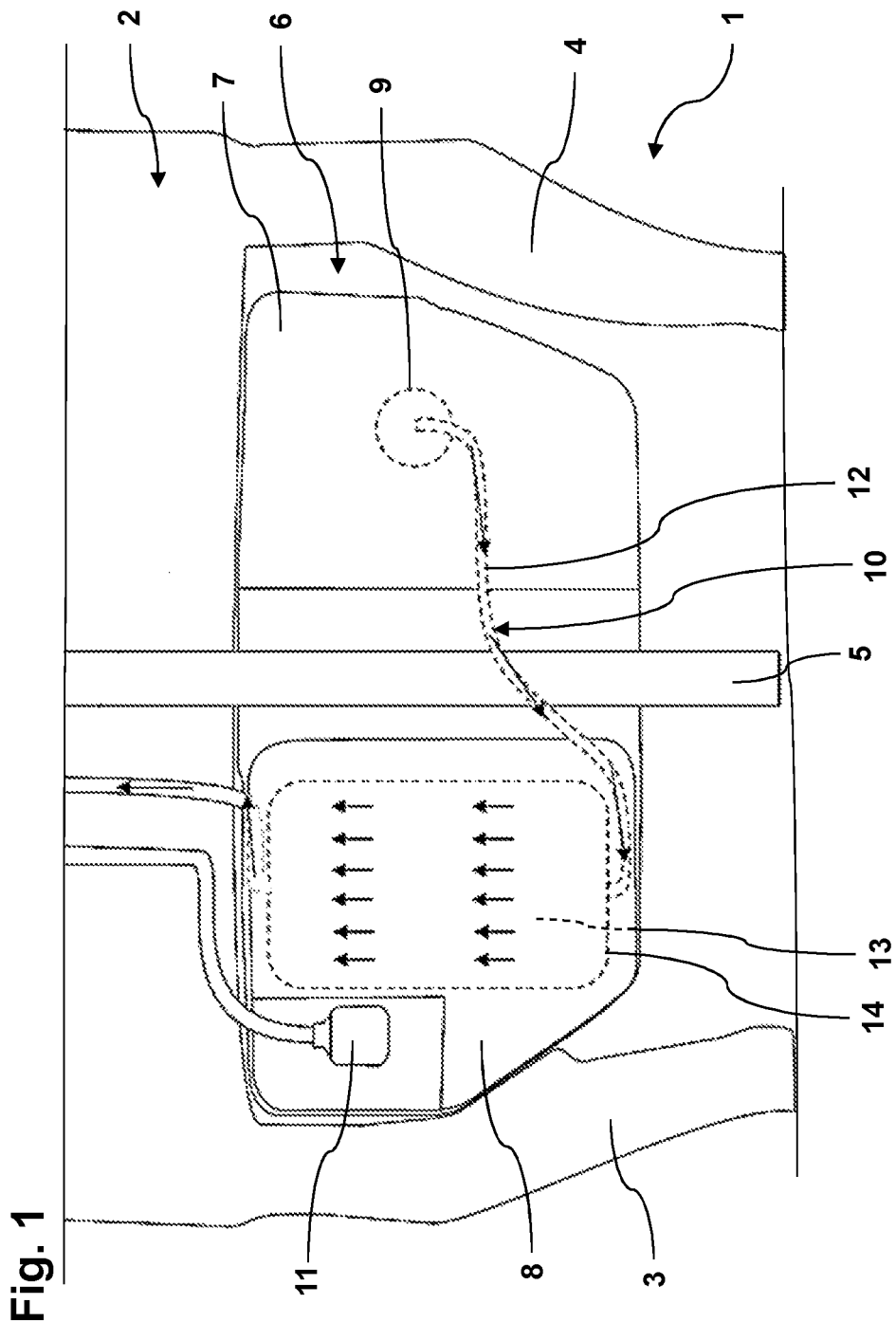
FIG. 1 shows is a schematic bottom view of a portion of an embodiment of a hybrid electric vehicle according to an exemplary aspect of the present disclosure.

FIG. 1 is a schematic bottom view of a rear end portion of an exemplary embodiment of a vehicle, in particular a hybrid electric vehicle 1, which is referred to below as a hybrid electric vehicle 1. The hybrid electric vehicle 1 has a lower base 2 having two lateral side carriers 3 and 4. A portion of an exhaust pipe 5 which extends in the longitudinal direction of the vehicle is additionally shown.

The hybrid electric vehicle 1 has an assembly 6 which has a fuel tank 7, a traction battery 8 which is arranged outside the fuel tank 7 and which is thermally connected to the fuel tank 7, a fuel pump 9 which is arranged in the fuel tank 7 and a fuel line 10 which is connected to a pressure side of the fuel pump 9, wherein the fuel line 10 is used to supply an internal combustion engine (not shown) of the hybrid electric vehicle 1 with fuel. The flow direction of the fuel which is conveyed by means of the fuel pump 9 through the fuel line 10 is indicated with arrows. The traction battery 8 is connected by means of a battery connection 11 to additional electrical components (not shown) of the hybrid electric vehicle 1. The fuel tank 7 has in the region of the traction battery 8 and the exhaust pipe 5 a reduced height which can be seen in particular in FIG. 2. The traction battery 8 can be at least partially thermally connected to the fuel tank 7 by means of a heat-conducting paste which is not shown.

A line portion 12 of the fuel line 10 available inside the fuel tank 7 is thermally connected to a connection portion 13 of the fuel tank 7 which is thermally connected to the traction battery 8 or partially formed by the connection portion 13. The line portion 12 has an expanded flow chamber 14 which is thermally connected to the connection portion 13 or partially formed by the connection portion 13 and whose height provided with respect to a connection region which is not shown between the fuel tank 7 and the traction battery 8 is many times smaller than a width and a length of the flow chamber 14 provided in the through-flow direction. In the bottom view shown in FIG. 1, the flow chamber 14 completely covers the connection portion 13.

Figure 2:
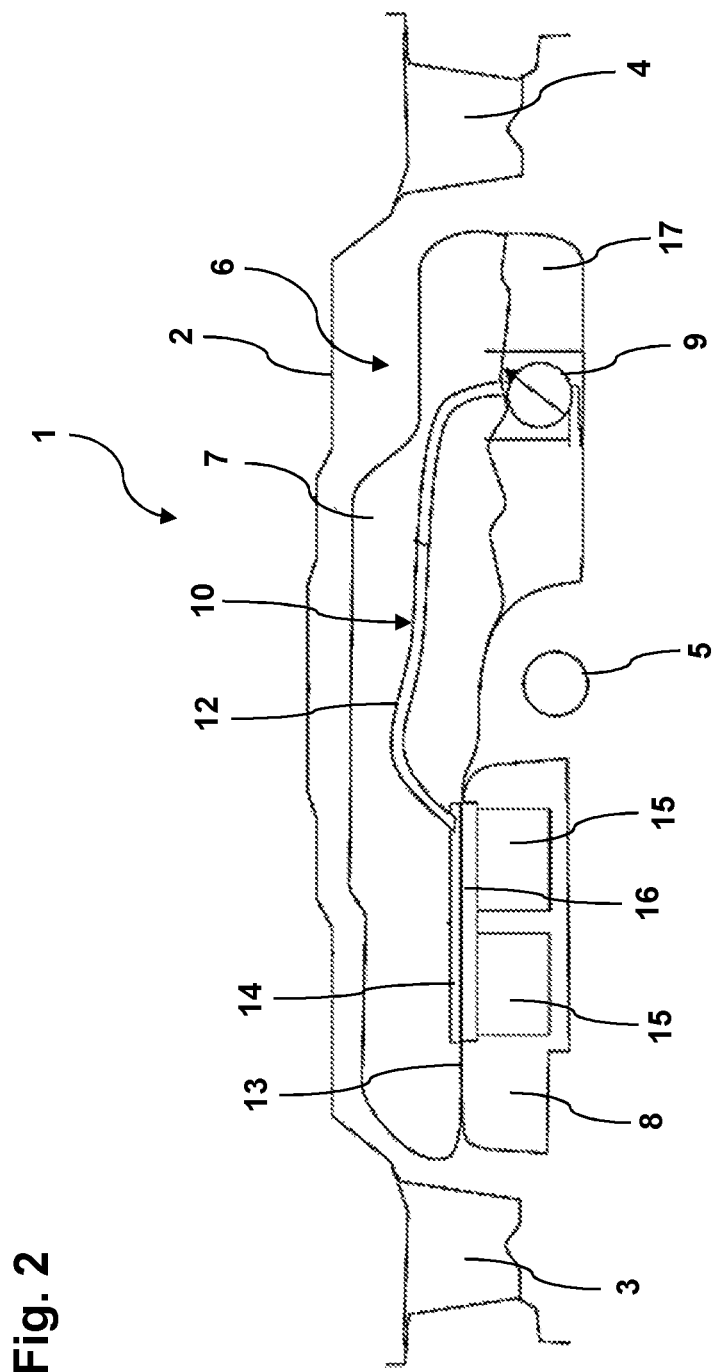
FIG. 2 shows a schematic sectioned illustration of the hybrid electric vehicle of in FIG. 1.

FIG. 2 is a schematic sectioned illustration of the hybrid electric vehicle 1 shown in FIG. 1. There are shown two battery cell modules 15 of the traction battery 8 which are each directly and thermally connected to a heat distribution plate 16, which in the embodiment shown forms a portion of the traction battery 8. In addition, a quantity of fuel 17 is shown inside the fuel tank 7.

Figure 3:
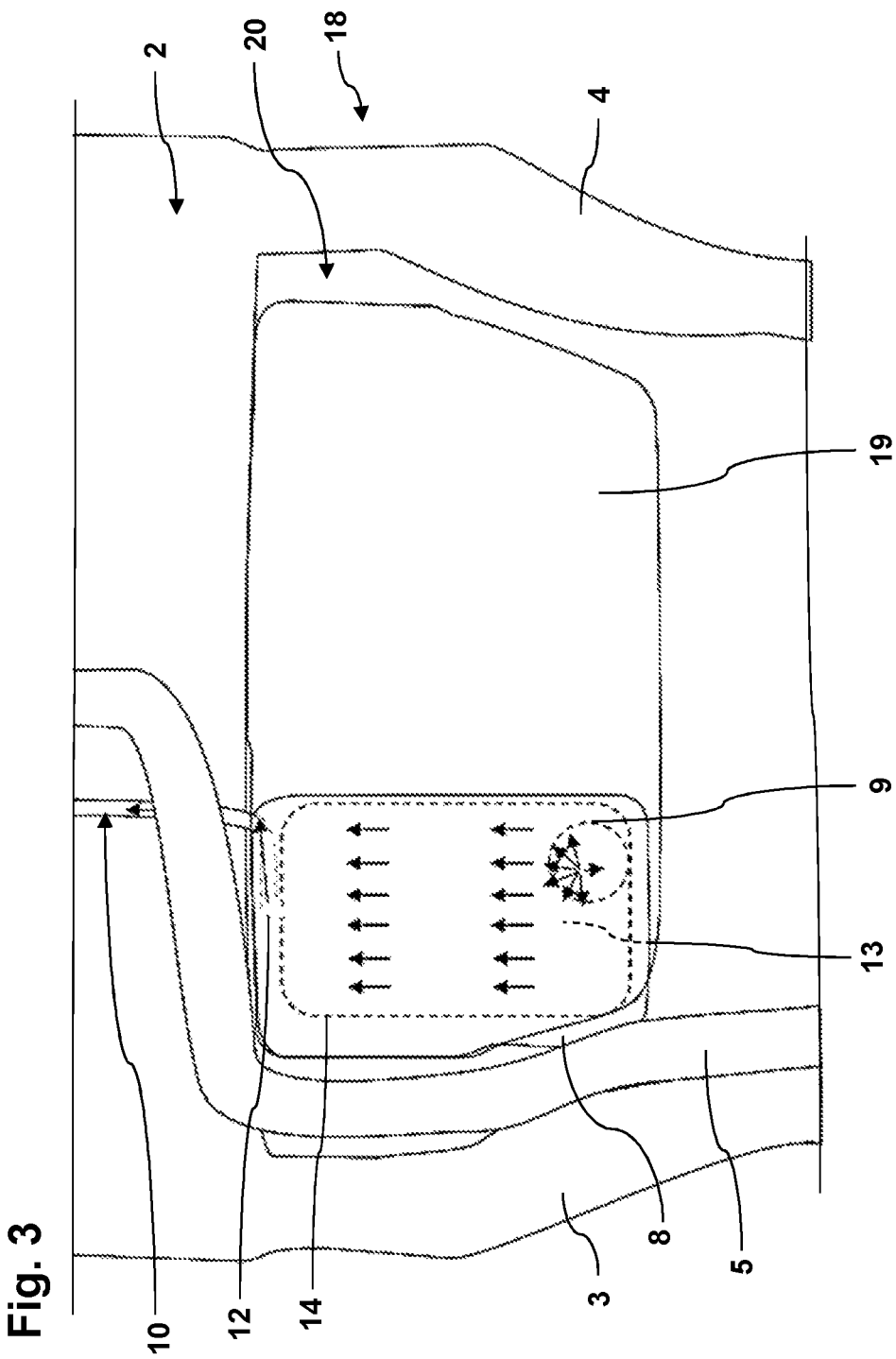
FIG. 3 shows a schematic bottom view of a portion of an additional embodiment of a hybrid electric vehicle.

FIG. 3 is a schematic bottom view of a rear end portion of an additional embodiment of a hybrid electric vehicle 18. The hybrid electric vehicle 18 differs in particular from the embodiment shown in FIGS. 1 and 2 in that the traction battery 8 is connected to an upper side of the fuel tank 19, for which purpose the fuel tank 19 has a different shape from the fuel tank shown in FIGS. 1 and 2. In addition, the fuel pump 9 is arranged below the traction battery 8. Furthermore, the portion of the exhaust pipe 5 is guided laterally past the assembly 20. Furthermore, no heat distribution plate according to FIGS. 1 and 2 is present. In order to prevent repetition, reference may further be made to the above description in relation to FIGS. 1 and 2.

Figure 4:
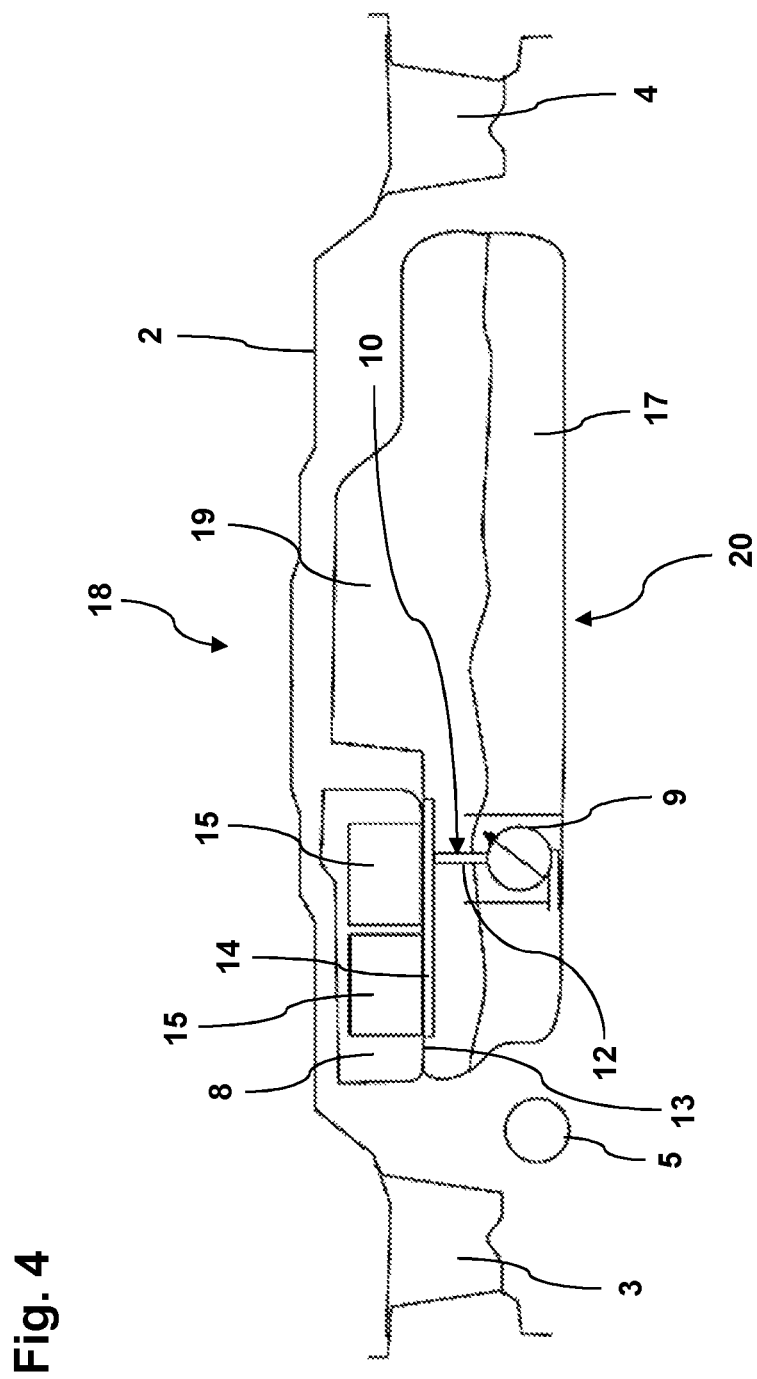
FIG. 4 shows a schematic sectioned illustration of the hybrid electric vehicle of FIG. 3.

FIG. 4 is a schematic sectioned illustration of the hybrid electric vehicle 18 (shown in FIG. 3). It can be seen that the fuel tank 19 also has in this embodiment a reduced height in the region of the traction battery 8.

Figure 5:
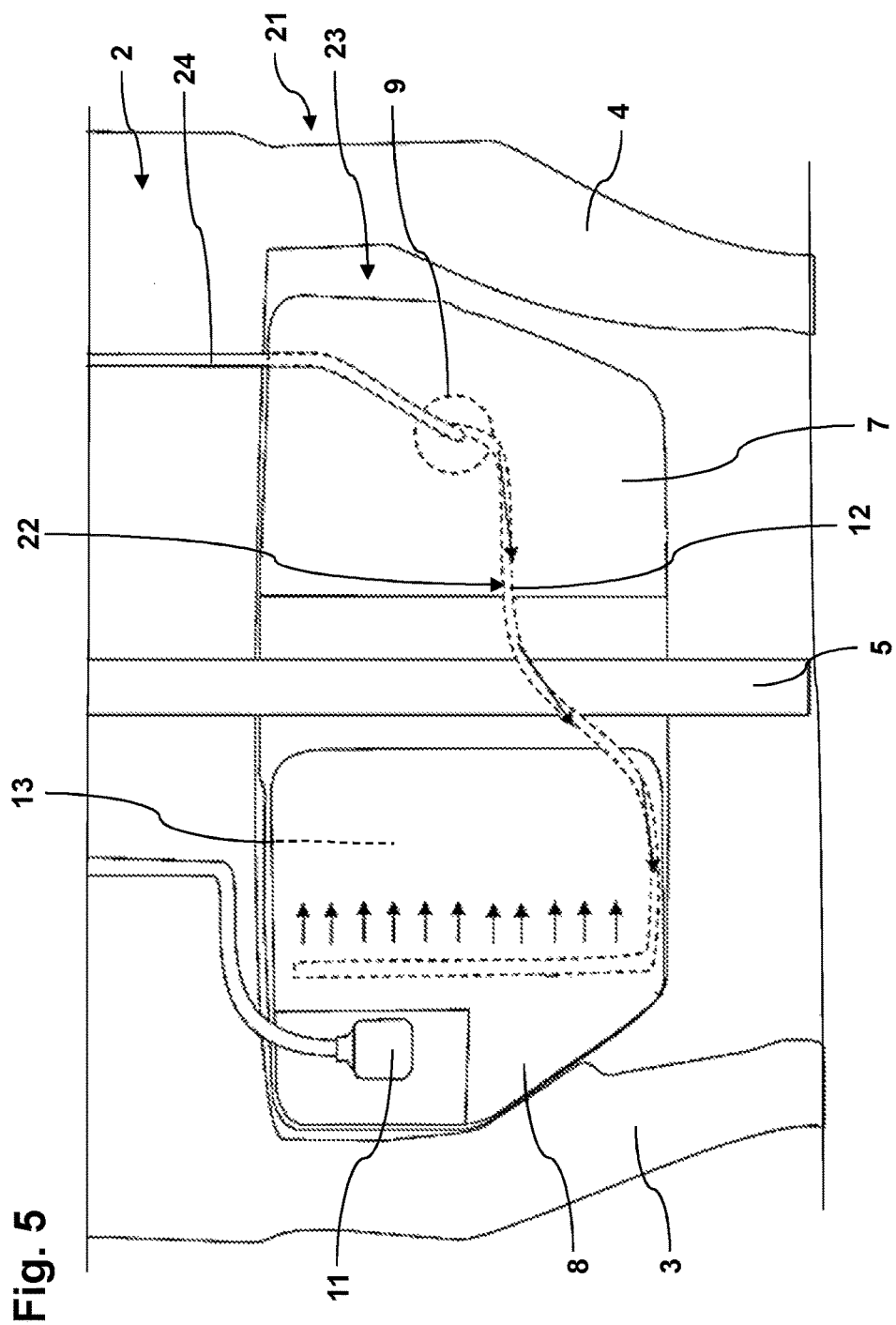
FIG. 5 shows a schematic bottom view of a portion of an additional embodiment of a hybrid electric vehicle according to another exemplary aspect of the present disclosure.

FIG. 5 is a schematic bottom view of a rear end portion of an additional embodiment of a hybrid electric vehicle 21. The hybrid electric vehicle 21 differs in particular from the embodiment shown in FIGS. 1 and 2 in that the fuel line 22 has a plurality of lateral fuel outlet openings which are not shown and which are arranged in the fuel tank 7 and which are arranged in such a manner relative to the connection portion 13 of the fuel tank 7 that a fuel which is discharged from the respective fuel outlet opening flows over at least a portion of the connection portion 13. In order to prevent repetition, reference may further be made to the above description in relation to FIGS. 1 and 2.

Figure 6:
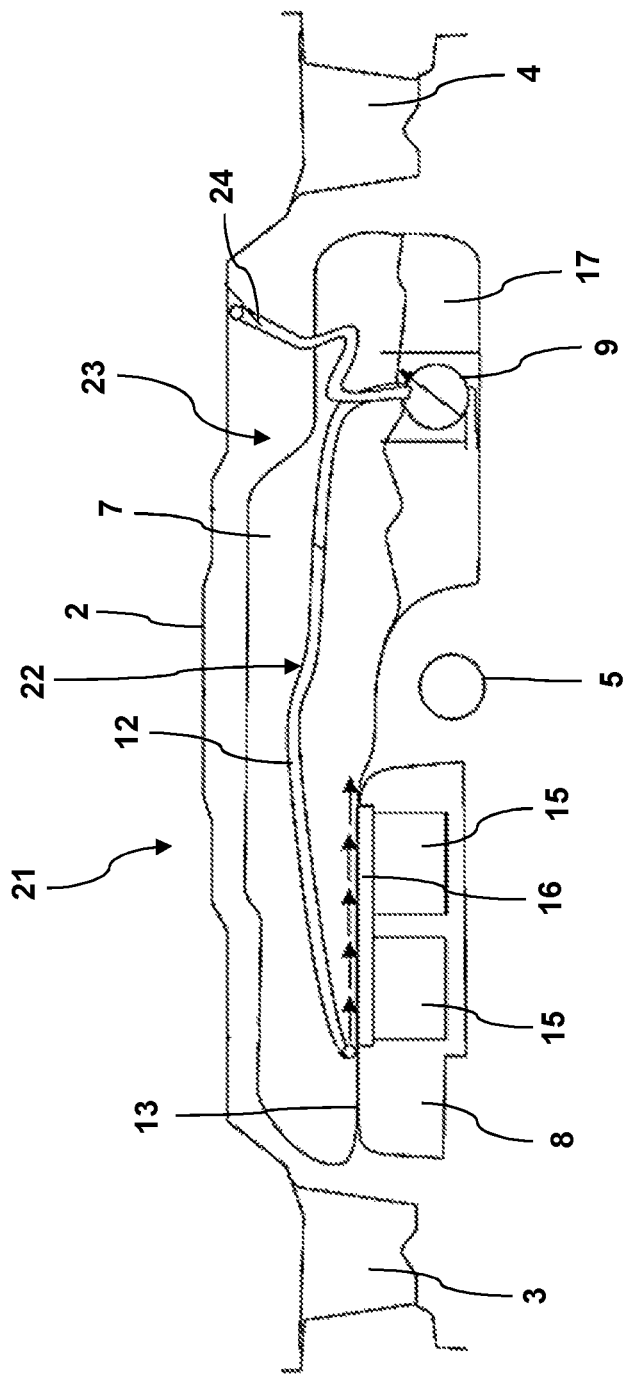
FIG. 6 shows a schematic sectioned illustration of the hybrid electric vehicle of FIG. 5.

Each fuel outlet opening is arranged in such a manner relative to the connection portion 13 that the fuel discharged from the respective fuel outlet opening first comes into contact with a vertically higher region of the connection portion 13, as shown in particular in FIG. 6. The fuel discharged from the fuel outlet openings is indicated by parallel arrows. Vertical, for purposes of this disclosure, is with reference to the ground or horizon and an ordinary orientation of the vehicle 21 during operation.

The fuel line 22 is arranged exclusively inside the fuel tank 7. An electrically controllable valve, which is not shown, can be arranged on the fuel line 22. The assembly 23 may have an electronic control system which is electrically connected to the valve and which is not shown and which is configured to control the valve in accordance with a current temperature of the traction battery 8. There is further connected to the pressure side of the fuel pump 9 a fuel supply line 24 which supplies fuel to the internal combustion engine (not shown) of the hybrid electric vehicle 21.

FIG. 6 is a schematic sectioned illustration of the hybrid electric vehicle 21 shown in FIG. 5.

Figure 7:
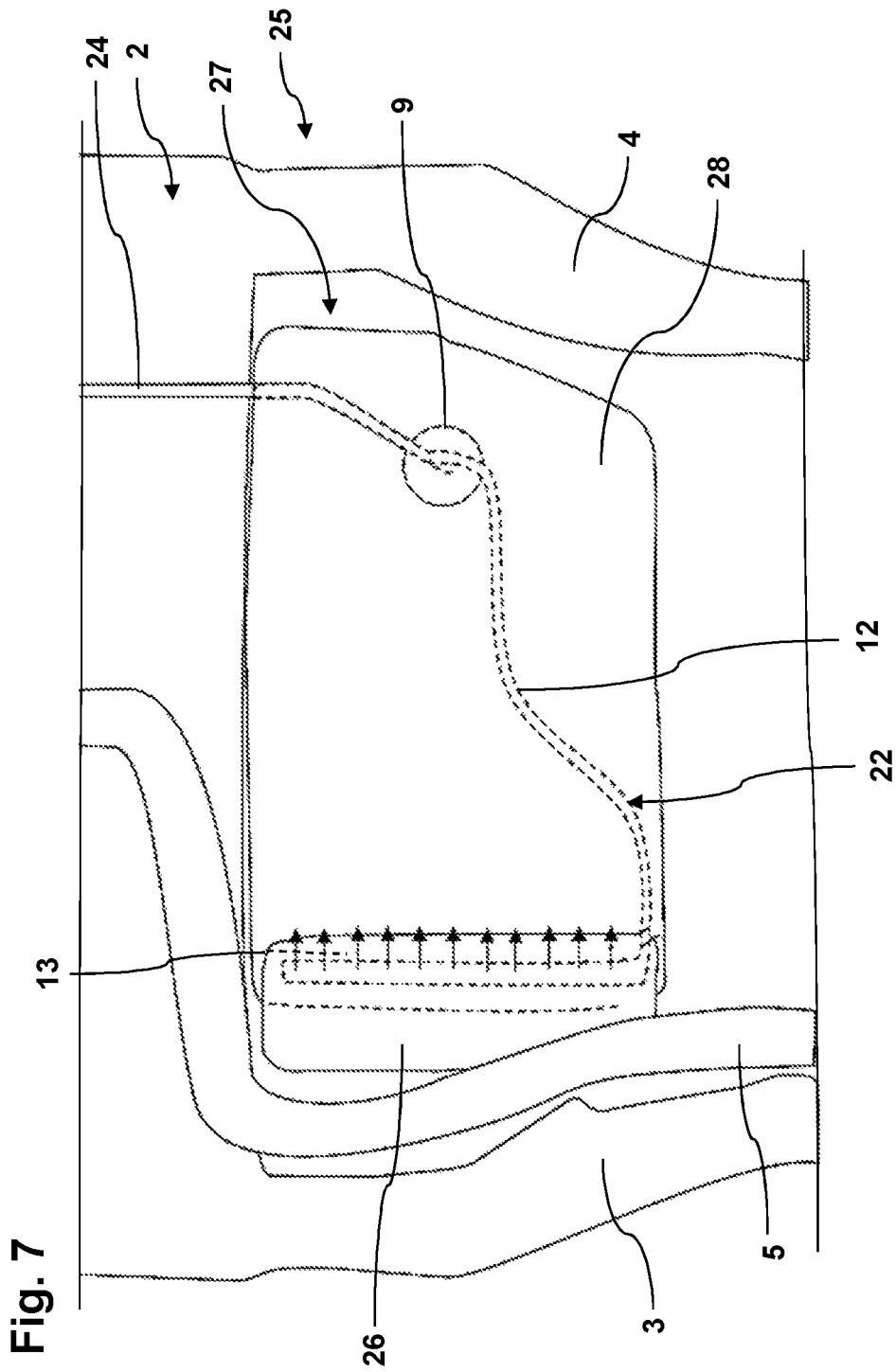
FIG. 7 shows a schematic bottom view of a portion of an additional embodiment of a hybrid electric vehicle according to another exemplary aspect of the present disclosure.

FIG. 7 is a schematic bottom view of a rear end portion of another embodiment of a hybrid electric vehicle 25. The hybrid electric vehicle 25 differs in particular from the embodiment shown in FIGS. 5 and 6 in that the traction battery 26 of the assembly 27 is arranged laterally on the fuel tank 28, for which purpose the fuel tank 28 has a correspondingly changed shape, and in that the portion of the exhaust pipe 5 is guided laterally past the assembly 27. In order to prevent repetition, reference may further be made to the above description in relation to FIGS. 5 and 6.

Figure 8:
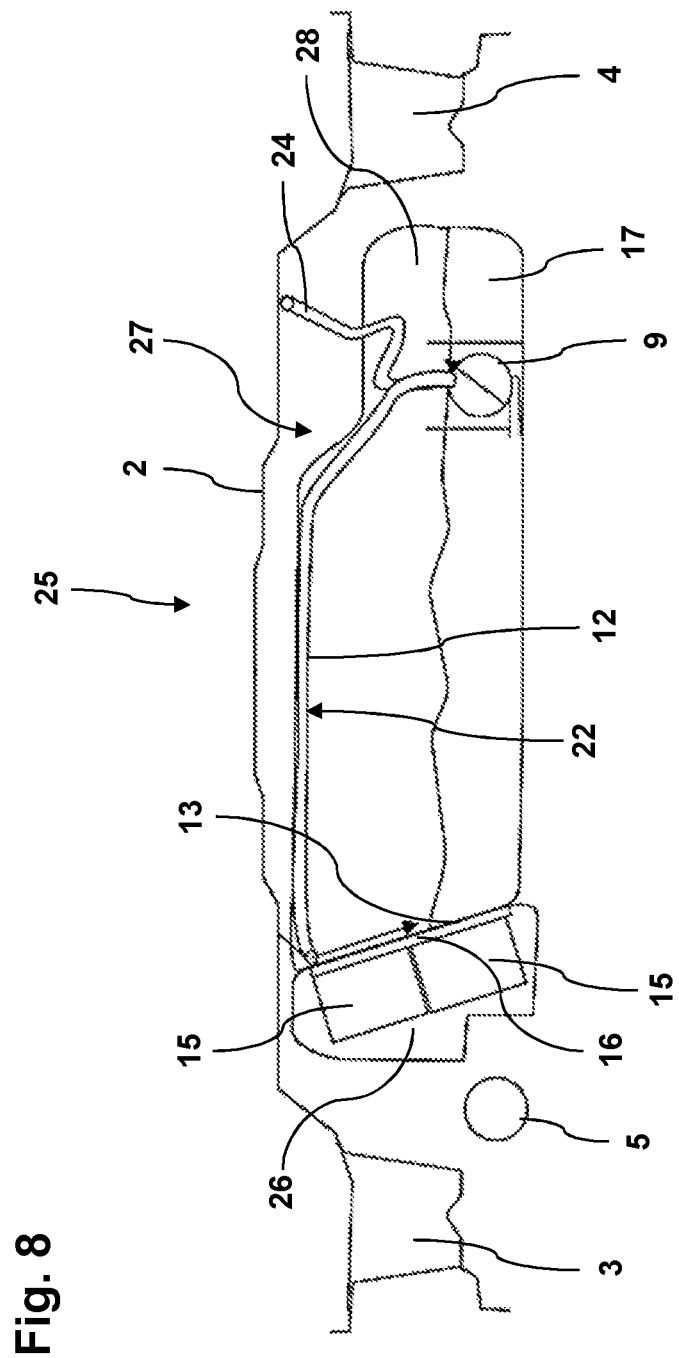
FIG. 8 shows a schematic sectioned illustration of the hybrid electric vehicle of FIG. 7.

FIG. 8 is a schematic sectioned illustration of the hybrid electric vehicle 25 shown in FIG. 7. It can be seen that the connection portion 13 of the fuel tank 28 is arranged in a steeply inclined manner.

Figure 9:
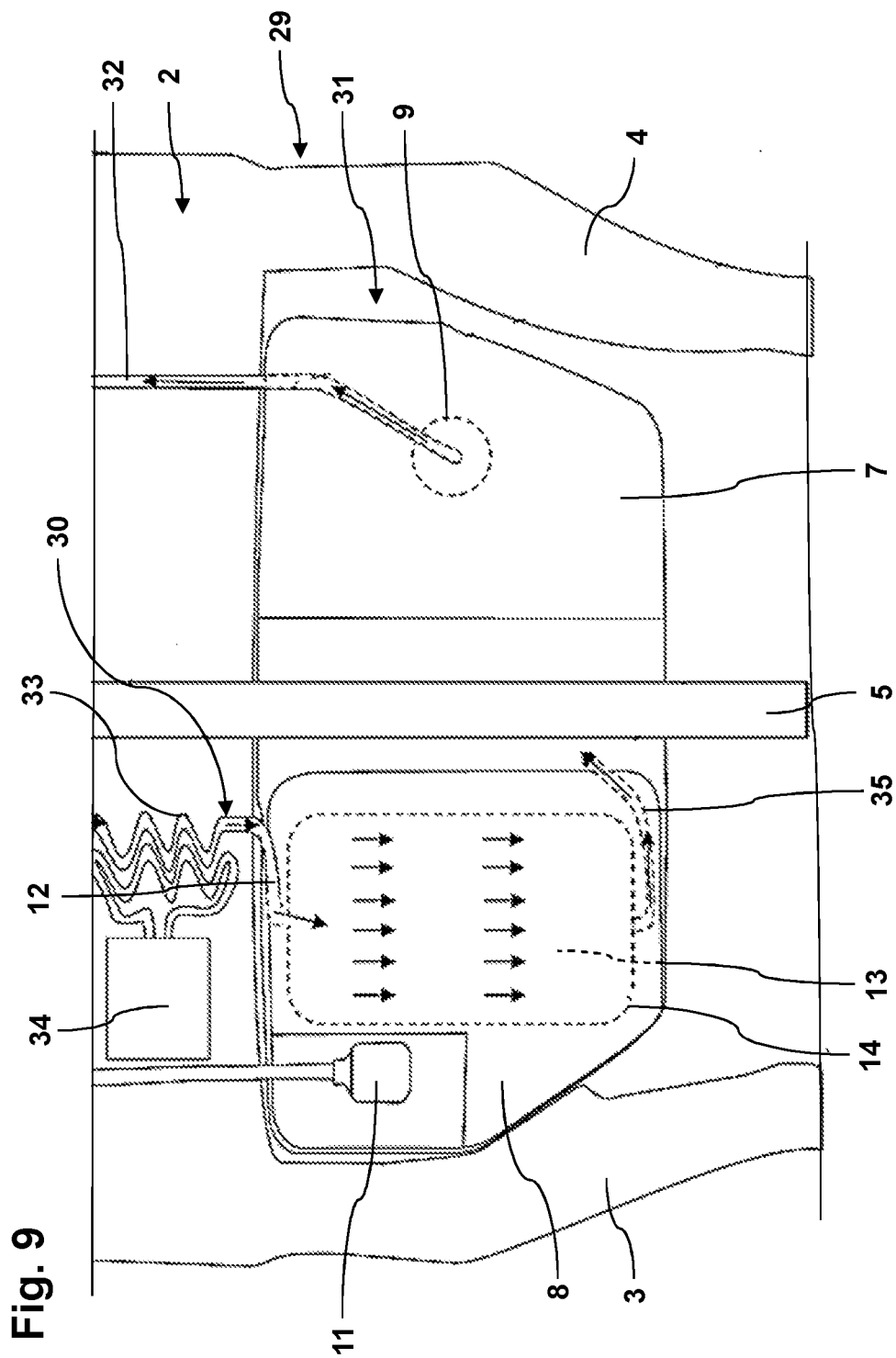
FIG. 9 shows a schematic bottom view of a portion of an additional embodiment of a hybrid electric vehicle to another exemplary aspect of the present disclosure.

FIG. 9 is a schematic bottom view of a portion of another embodiment of a hybrid electric vehicle 29. The hybrid electric vehicle 29 differs in particular from the embodiment shown in FIGS. 1 and 2 in that the fuel line 30 of the assembly 31 is formed by a portion of a fuel supply line 32 which is connected to the pressure side of the fuel pump 9 and which connects the fuel tank 7 to the internal combustion engine which is not shown and a fuel return line 33 which is connected thereto and which is guided into the fuel tank 7. In addition, the assembly 31 has a cooler 34 which is arranged outside the fuel tank 7 and which is thermally connected to the fuel line 30 or the fuel return line 33 and by means of which the fuel which flows in the fuel return line 33 is cooled.

The assembly 31 may have an electronic control system which is not shown and which is electrically connected to the fuel pump 9 and which is configured to control the fuel pump 9 at least temporarily in such a manner that a pump power of the fuel pump 9 is higher than required for current operation of the internal combustion engine.

The line portion 12 of the fuel line 30 which is located in the fuel tank 7 has an expanded flow chamber 14 which is thermally connected to the connection portion 13 of the fuel tank 7 or which is partially formed by the connection portion 13 and whose height provided with respect to a connection region (not shown) between the fuel tank 7 and the traction battery 8 is many times smaller than a width and a length of the flow chamber 14. The fuel is discharged via a fuel discharge line 35 from the flow chamber 14. In order to prevent repetition, reference may further be made to the above description in relation to FIGS. 1 and 2.

Figure 10:
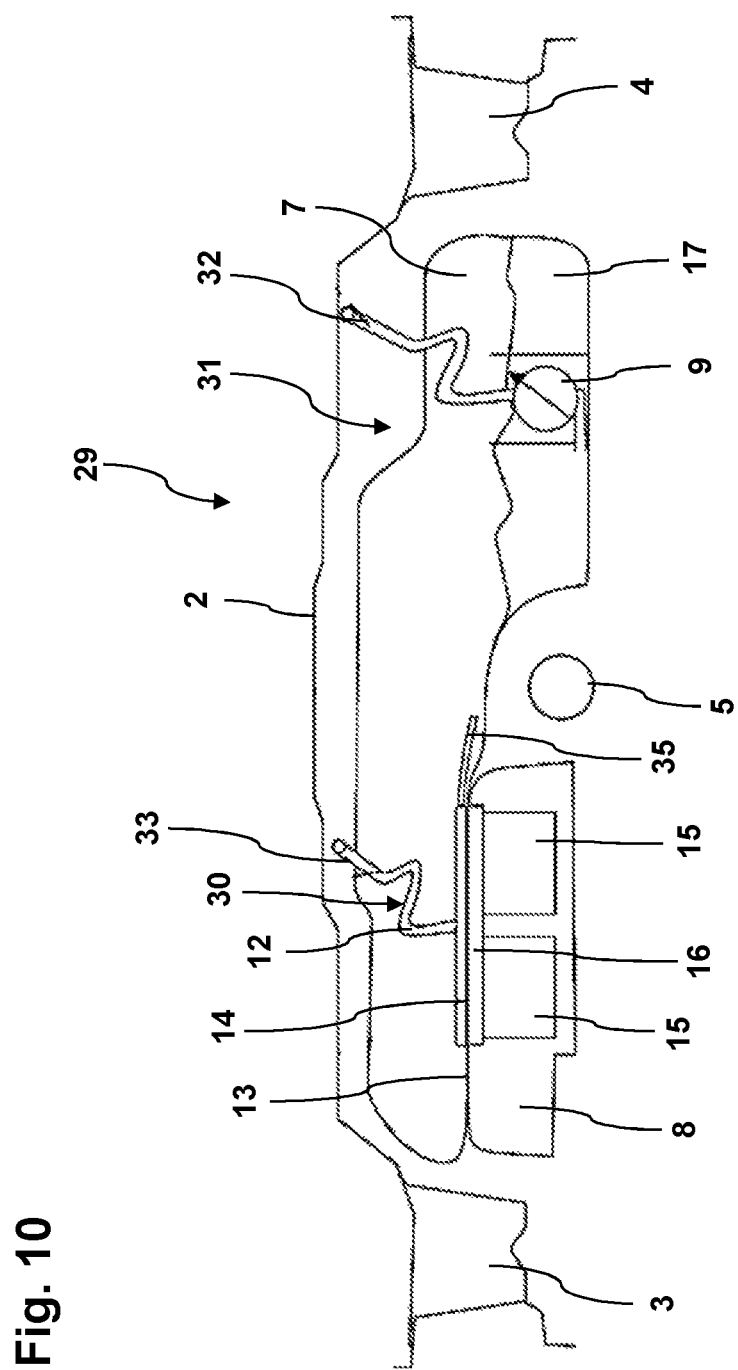
FIG. 10 shows a schematic sectioned illustration of the hybrid electric vehicle of FIG. 9.

FIG. 10 is a schematic sectioned illustration of the hybrid electric vehicle 29 shown in FIG. 9.

Although exemplary embodiments of this disclosure are described in particular with reference to hybrid vehicles, purely electric vehicles are also included within the scope of this disclosure. Although electric vehicles have no internal combustion engine for driving the vehicle, they may have fuel-operated units, such as, for example, fuel-operated auxiliary heating systems. These electric vehicles naturally have in this regard a fuel tank which stores the fuel for the fuel-operated units. This fuel tank of the purely electric vehicle or the fuel which is stored in the fuel tank can be used as described above for cooling the battery as required.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An assembly for a vehicle, comprising:
   at least one fuel tank;
   at least one traction battery arranged outside the fuel tank and thermally connected to the fuel tank;
   at least one fuel pump arranged in the fuel tank;
   at least one fuel line configured to connect to a pressure side of the fuel pump; and
   at least one line portion of the fuel line disposed inside the fuel tank, the at least one line portion thermally connected to a connection portion of the fuel tank or partially formed by the connection portion, the connection portion thermally connected to the traction battery,
   wherein the at least one line portion of the fuel line includes at least one expanded flow chamber, wherein a vertical height of the at least one expanded flow chamber is less than a horizontal width of the flow chamber and less than a horizontal length of the flow chamber.

2. The assembly of claim 1, further comprising a hybrid electric vehicle having the at least one fuel tank.

3. The assembly of claim 1, wherein the fuel line is arranged exclusively inside the fuel tank, and at least one electrically controllable valve is arranged on the fuel line, wherein the assembly has at least one electronic control system that is electrically connected to the valve and is configured to control the valve in accordance with a current temperature of the traction battery.

4. The assembly of claim 1, wherein the fuel line is formed by a portion of a fuel supply line that is connected to the pressure side of the fuel pump and that connects the fuel tank to an internal combustion engine, and the fuel line is further formed by a fuel return line which is connected to the internal combustion engine and is guided into the fuel tank.

5. The assembly of claim 4, further comprising at least one cooler that is arranged outside the fuel tank and is thermally connected to the fuel line.

6. The assembly of claim 4, further comprising at least one electronic control system that is electrically connected to the fuel pump is configured to at least temporarily control the fuel pump in such a manner that a pump power of the fuel pump is higher than required for current operation of the internal combustion engine.

7. The assembly of claim 1, wherein the connection portion is part of the fuel tank.

8. An assembly for a vehicle, comprising:
at least one fuel tank;
at least one traction battery arranged outside the fuel tank and thermally connected directly to a connection portion of the fuel tank;
at least one fuel pump arranged in the fuel tank; and
at least one fuel line configured to connect to a pressure side of the fuel pump, the at least one fuel line having at least one fuel outlet opening arranged in the fuel tank relative to the connection portion of the fuel tank such that a fuel discharged from the fuel outlet opening flows over at least a portion of a connection portion that is thermally connected to the traction battery.

9. The assembly of claim 8, further comprising a hybrid electric vehicle having the at least one fuel tank.

10. The assembly of claim 8, wherein the at least one line portion of the fuel line includes at least one expanded flow chamber, wherein a vertical height of the at least one expanded flow chamber is less than a horizontal width of the flow chamber and less than a horizontal length of the flow chamber.

11. The assembly of claim 8, wherein the fuel line is arranged exclusively inside the fuel tank, and at least one electrically controllable valve is arranged on the fuel line, wherein the assembly has at least one electronic control system that is electrically connected to the valve and is configured to control the valve in accordance with a current temperature of the traction battery.

12. The assembly of claim 8, wherein the fuel line is formed a portion of a fuel supply line that is connected to the pressure side of the fuel pump and that connects the fuel tank to an internal combustion engine, and the fuel line is further formed by a fuel return line which is connected to the internal combustion engine and is guided into the fuel tank.

13. The assembly of claim 12, further comprising at least one cooler that is arranged outside the fuel tank and is thermally connected to the fuel line.

14. The assembly of claim 12, further comprising at least one electronic control system that is electrically connected to the fuel pump is configured to at least temporarily control the fuel pump in such a manner that a pump power of the fuel pump is higher than required for current operation of the internal combustion engine.

15. The assembly of claim 8, wherein the connection portion provides part of the fuel tank.

16. A traction battery thermal management method, comprising:
pumping fuel through a fuel line within a fuel tank to cool a connection portion of the fuel tank, wherein in at least one traction battery is arranged outside the fuel tank and is thermally connected directly to a connection portion of the fuel tank.

17. The method of claim 16, wherein at least one line portion of the fuel line disposed inside the fuel tank, the at least one line portion thermally connected to the connection portion of the fuel tank or partially formed by the connection portion, the connection portion thermally connected to the traction battery.

18. The method of claim 16, wherein the connection portion is part of the fuel tank.

* * * * *